E. E. JEFFERY.
ANIMAL INCLOSURE.
APPLICATION FILED DEC. 20, 1909.
980,789.
Patented Jan. 3, 1911.
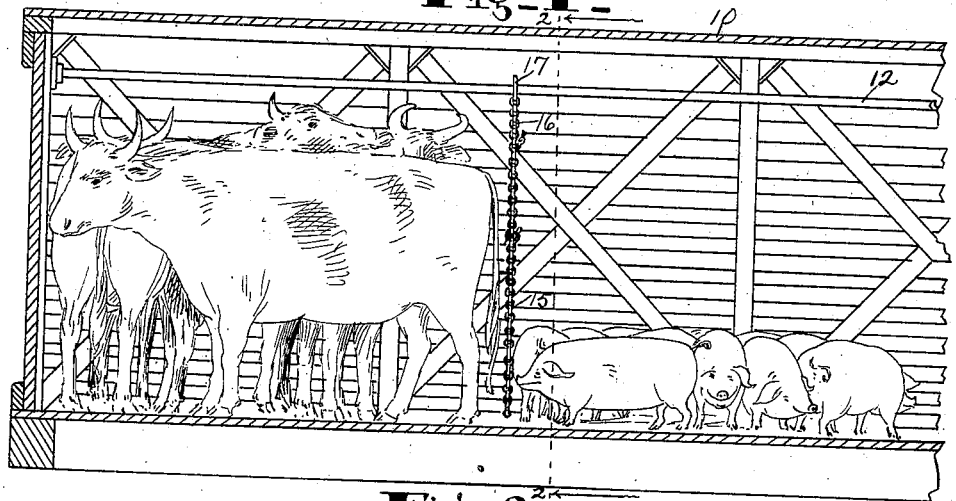
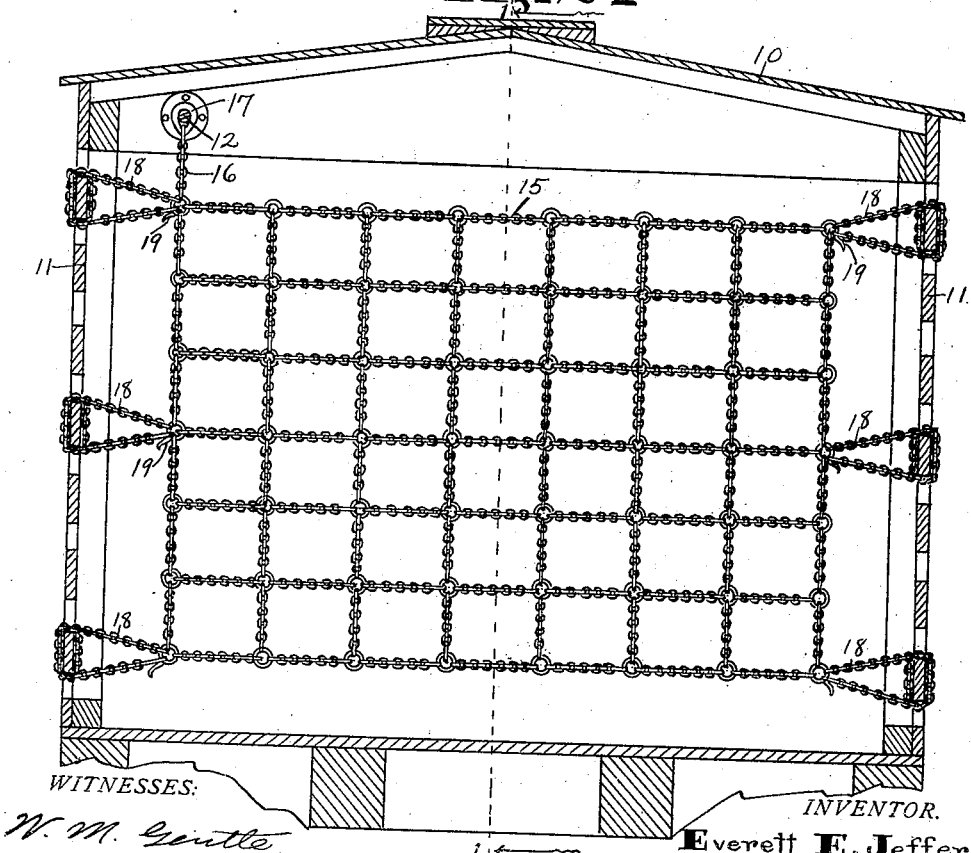
WITNESSES:
W. M. Gentle
O. M. McLaughlin
INVENTOR.
Everett E. Jeffery.
BY
V. H. Lockwood
ATTORNEY.

UNITED STATES PATENT OFFICE.

EVERETT E. JEFFERY, OF FRANKLIN, INDIANA.

ANIMAL-INCLOSURE.

980,789.     Specification of Letters Patent.     Patented Jan. 3, 1911.

Application filed December 20, 1909. Serial No. 534,099.

*To all whom it may concern:*

Be it known that I, EVERETT E. JEFFERY, of Franklin, county of Johnson, and State of Indiana, have invented a certain new and useful Animal-Inclosure; and I do hereby declare that the following is a full, clear, and exact description thereof, reference being had to the accompanying drawings.

The object of this invention is to provide a convenient and economical means for separating animals in cars or other places where it is desirable to have different animals in different compartments.

The invention was made with particular reference to separating cattle and swine in stock cars, for when both classes of animals are in the same car, the swine will be injured by the cattle unless kept separate.

The chief feature of the invention consists in providing a partition preferably formed of cables, chains, or the like, with hooked extensions from the sides adapted to be caught over and wrapped around side bars of the stock car to hold the same from lateral movement, and yet it can be readily disengaged, so that the partition will collapse and can be swung into one side of the car out of the way and used again and again, and for the purpose of preservation, the partition is swung from a bar extending longitudinally of the car along one side so that it can be slipped along thereon in any desired place for use.

The nature of the invention will be understood from the accompanying drawings and the following description and claim.

In the drawings Figure 1 is a vertical longitudinal section through a portion of a stock car on the line 1—1 of Fig. 2. Fig. 2 is a transverse vertical section through the car on the line 2—2 of Fig. 1.

There is shown in the drawings a stock car 10 of ordinary type having side bars 11. A rod 12 is secured within the car near the roof and extends longitudinally from end to end thereof, and is also near one side of the car preferably. Therefore, it is out of the way of the cattle, or anything else that may be placed in the car. The partition 15 is a flexible cable or chain partition and it can be made in various ways, the form herein shown consisting of a series of chains arranged horizontally and vertically and secured together at their inner sections, and at one upper corner there is a chain 16 that is suspended from a link 17 slidable on the rod 12. From each end of the partition 15 there are chains 18 secured at one end to the partition with hooks 19 at the other end thereof. These chains are long enough to be wrapped around the side bar 11 of the car one or more times, and then the hook 19 is caught into engagement with the partition 15. In the form shown herein there are three of these side chains secured at each end of the partition, but the number may be varied. There should, however, be one at the top, one at the bottom and one or more between. The wrapping of these chains 18 around the bars 11 will prevent the longitudinal sliding movement of the partition to any appreciable extent, and that will hold the flexible partition drawn taut, so as to maintain it in its proper partition, and yet the partition will be flexible and to some extent yielding as the animals pitch against it by the bumping of the car.

When not needed to separate animals, the hook chains 18 are all disengaged from the bars, and the whole separating device is pushed down to one end and corner of the car out of the way and hangs there from the rod 12. Hence it will not interfere with filling the car with one class of animals or putting in it melons, lumber, barrels, or other freight.

I do not wish to be limited to the precise details of construction herein, as they may be varied without departing from the spirit of the invention.

What I claim as my invention and desire to secure by Letters Patent is:

The combination with a car or other inclosure for animals, of a longitudinally extending rod in the upper part near one side of said inclosure, a partition formed of chains, cables or the like so as to be flexible, means suspended from said rod so as to slide thereon that is connected with said partition at the upper side corner thereof, and means at the ends of the partition for detachably securing it to the sides of the inclosure.

In witness whereof, I have hereunto affixed my signature in the presence of the witnesses herein named.

EVERETT E. JEFFERY.

Witnesses:
    G. H. BOINK,
    O. M. McLAUGHLIN.